United States Patent [19]

Shou et al.

[11] Patent Number: 5,907,496

[45] Date of Patent: May 25, 1999

[54] MULTIPLICATION AND ADDITION CIRCUIT

[75] Inventors: Guoliano Shou; Kazunori Motohashi, both of Tokyo, Japan

[73] Assignee: Yozan Inc., Tokyo, Japan

[21] Appl. No.: 08/921,578

[22] Filed: Sep. 2, 1997

[30] Foreign Application Priority Data

Sep. 3, 1996 [JP] Japan ................................. 8-252328
Oct. 17, 1996 [JP] Japan ................................. 8-295742

[51] Int. Cl.$^6$ .............................. G06J 1/00; G06G 7/16
[52] U.S. Cl. .............................. 364/606; 364/841
[58] Field of Search .............................. 364/841, 606

[56] References Cited

U.S. PATENT DOCUMENTS 5,388,063  2/1995  Takatori et al. .
5,396,442  3/1995  Shou et al. ........................ 364/606
5,396,446  3/1995  Shou et al. .
5,751,624  5/1998  Zhou et. al. ........................ 364/841

FOREIGN PATENT DOCUMENTS 6-168349  6/1994  Japan .

Primary Examiner—Tan V. Mai
Attorney, Agent, or Firm—Pillsbury Madison & Sutro LLP

[57] ABSTRACT

A multiplication and addition circuit multiplies each of a plurality of analog voltages by a corresponding digital multiplier and then adds up the products. First, each bit corresponding to each of the multipliers is multiplied with the corresponding analog voltage. Then, the products for each bit of the multiplier are added. The results are weighted by each bit weight and the weighted values are added. The multipliers are rotated so that there is the number of data transmission errors is lowered.

18 Claims, 8 Drawing Sheets

| Time | t0 | t0+Δt | t0+2Δt | t0+3Δt |
| --- | --- | --- | --- | --- |
| V(SH1) | Vin(t0) | Vin(t0) | Vin(t0) | Vin(t0) |
| V(SH2) | Vin(t0-Δt) | Vin(t0-Δt) | Vin(t0-Δt) | Vin(t0-Δt) |
| V(SH3) | Vin(t0-2Δt) | Vin(t0-2Δt) | Vin(t0-2Δt) | Vin(t0-2Δt) |
| V(SH4) | Vin(t0-3Δt) | Vin(t0-3Δt) | Vin(t0-3Δt) | Vin(t0-3Δt) |
| V(SH5) | Vin(t0-4Δt) | Vin(t0-4Δt) | Vin(t0-4Δt) | Vin(t0-4Δt) |
| V(SH6) | Vin(t0-5Δt) | Vin(t0-5Δt) | Vin(t0-5Δt) | Vin(t0+3Δt) |
| V(SH7) | Vin(t0-6Δt) | Vin(t0-6Δt) | Vin(t0+2Δt) | Vin(t0+2Δt) |
| V(SH8) | Vin(t0-7Δt) | Vin(t0+Δt) | Vin(t0+Δt) | Vin(t0+Δt) |
| M(ADD1) | m1 | m2 | m3 | m4 |
| M(ADD2) | m2 | m3 | m4 | m5 |
| M(ADD3) | m3 | m4 | m5 | m6 |
| M(ADD4) | m4 | m5 | m6 | m7 |
| M(ADD5) | m5 | m6 | m7 | m8 |
| M(ADD6) | m6 | m7 | m8 | m1 |
| M(ADD7) | m7 | m8 | m1 | m2 |
| M(ADD8) | m8 | m1 | m2 | m3 |

V(SHi): analog voltage stored in sampling and holding circuit SHi

M(ADDi): a multiplier adopted in addition circuit ADDi m1 to m8: eight multipliers Δt: a sampling cycle of a sampling and holding circuit Vin(t0-iΔt): analog input voltage from time t0 to time iΔt before t0

FIG. 10

MULTIPLICATION AND ADDITION CIRCUIT

FIELD OF THE INVENTION

The present invention relates to a multiplication and addition circuit for multiplying each of a plurality of analog voltages by a corresponding digital multiplier and summing the products.

BACKGROUND OF THE INVENTION

The applicant of the present invention proposes in Japanese Patent Laid-Open Publication No. 6-168349 a usable multiplication circuit for the above field, which realizes multiplication of an analog voltage and a digital multiplier without analog-to-digital (A/D) conversion.

FIG. 9 shows a conventional circuit. Input voltage X is input to capacitive coupling CP including capacitances CC0 to CC8 through switches SW1 to SW8. The output of CP is input to inverting amplifying circuit INV2, whose output is connected to its input through feedback capacitance C3.

CP outputs the result of multiplication and addition operation for X wherein multiplication is done by multiplying X by a weight which is proportional to each capacitance, and INV2 transmits the outputs to the next stage with good linearity due to the large gain and the feedback system of C3. As each capacitance of CP corresponds to each binary bit, multiplication with binary numbers can be performed by controlling the opening and closing of each switch.

Through intermediate capacitance C4, the output of INV2 is connected to inverting amplifying circuit INV3, whose input and output are connected through feedback capacitance C5. The output of CP is transmitted to the two successive stages to obtain a non-inverted output.

In CP, capacitance CC8 is also connected in parallel to the other capacitances. CC8 is connected to X through switch SW9, inverting amplifying circuit INV1 and capacitance C1, sequentially. The input and output of INV1 are connected through feedback capacitance C2. When switch SW9 is closed, inverted X (−X) is output with good linearity.

SUMMARY OF THE INVENTION

A capacitance is formed by unit capacitances of a predetermined size connected in parallel. In FIG. 9, many unit capacitances are needed because CC0 to CC7 must have a capacitance ratio corresponding to their binary bit weight. The number of capacitances for multiplication increases significantly as multiplication and addition is performed on larger numbers, resulting in large circuits.

The present invention solves the conventional problem, and provides a multiplication and addition circuit with a relatively small number of capacitances that can multiply each of a plurality of analog voltages by a corresponding digital multiplier and add the products.

A multiplication and addition circuit of the present invention first, multiplies each bit each of the multipliers with a corresponding analog voltage and adds the product for each bit of the multipliers. Then, the results are weighted by each bit weight and the weighted values are added. In a preferred embodiment, after each operation described above, the multipliers are rotated so that different multipliers are multiplied. Also, the present invention enable transmission errors to be lowered by rotating multipliers rather than transmitting data between the sampling and holding circuits.

BRIEF DESCRIPTION OF THE DRAWINGS

FIG. 10 shows the timing relationship between multipliers and analog voltages.

DETAILED DESCRIPTION OF A PREFERRED EMBODIMENT

Hereinafter, an embodiment of a multiplication and addition circuit according to the present invention is described according to the attached drawings.

Figure 1:
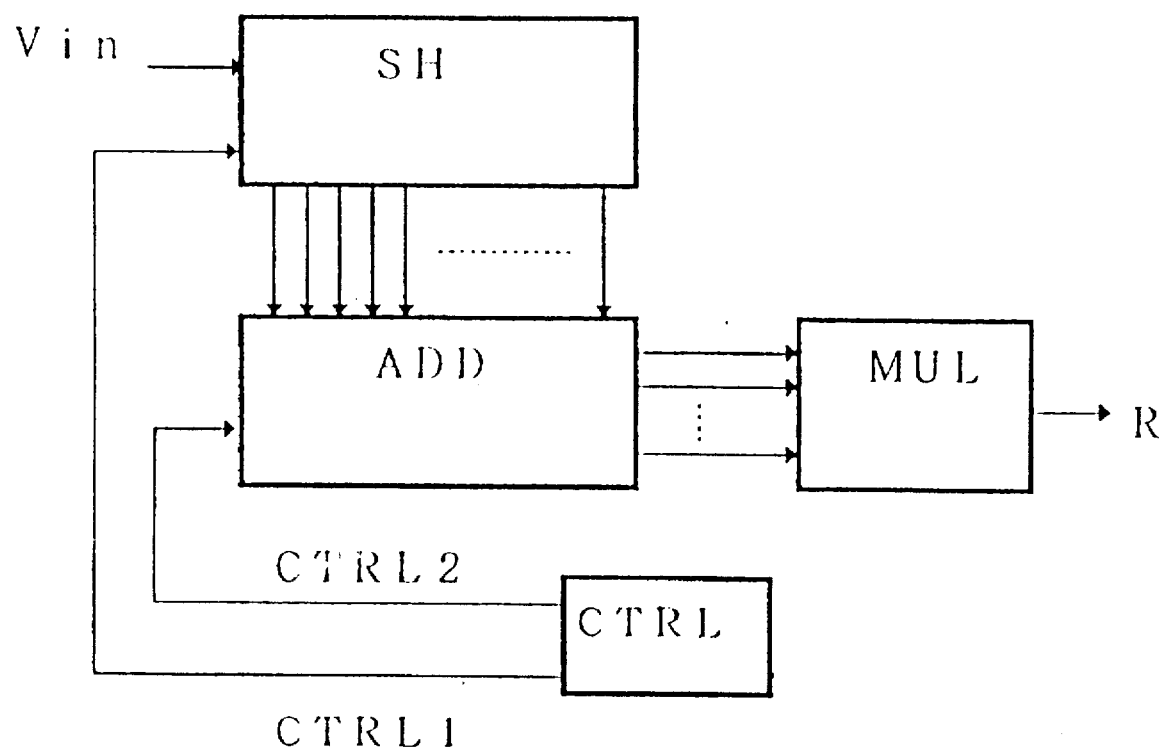
FIG. 1 shows an embodiment of an addition and multiplication circuit of the present invention.

FIG. 1 shows a multiplication and addition circuit. In FIG. 1, addition portion ADD is connected to sampling and holding circuit SH to which an analog input voltage Vin is input. A plurality of analog voltages are stored in SH to be added (described in detail later). The addition result is multiplied by multiplication portion MUL (described in detail later). Control signal CTRL1 is input to SH from multiplier control circuit CTRL, and control signal CTRL2 is input to ADD from CTRL.

Figure 2:
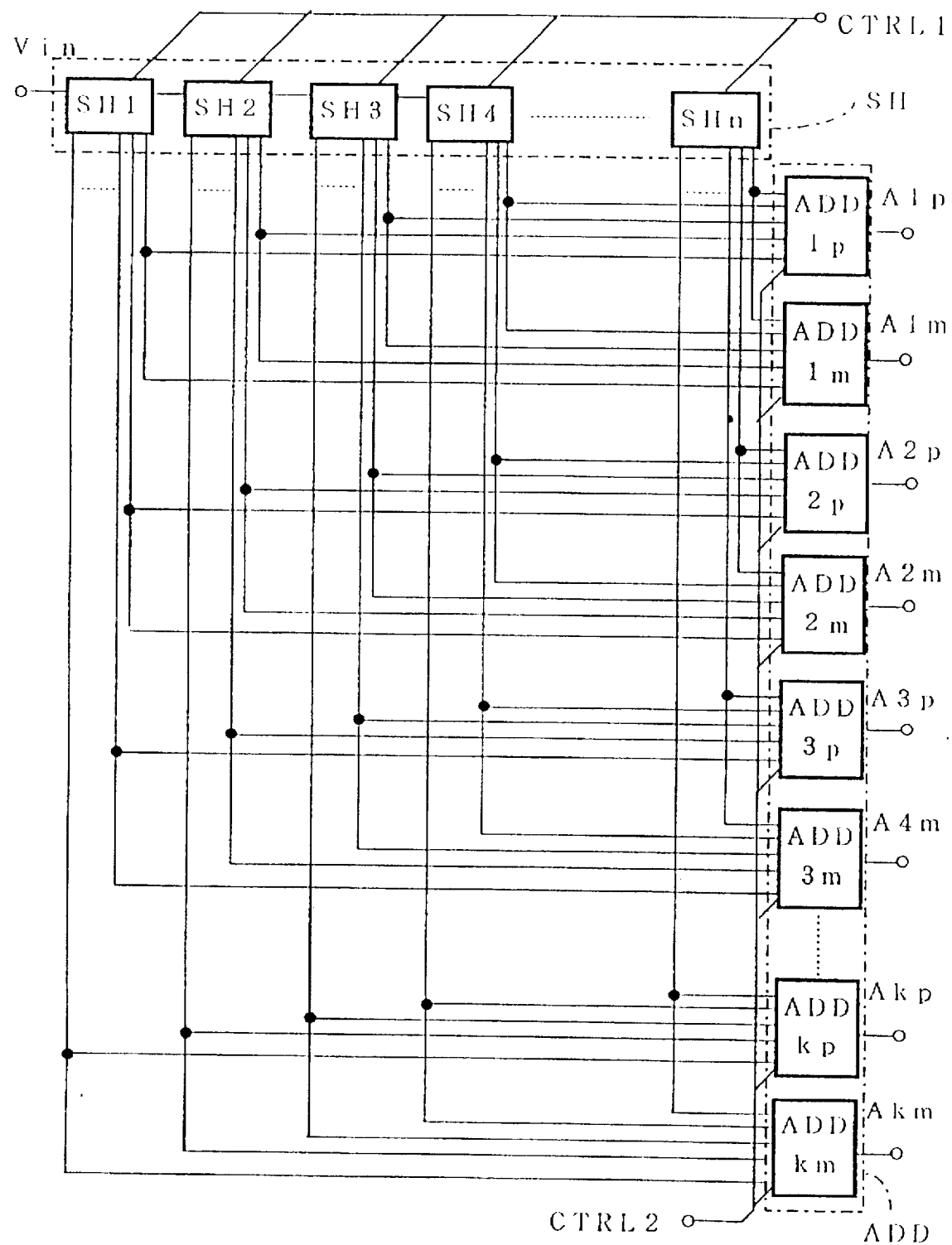
FIG. 2 shows a block diagram of the sampling and holding portion and the addition portion of a first embodiment of the present invention.

SH and ADD are structured as in FIG. 2. In SH, a plurality (n number) of sampling and holding circuits SH1 to SHn are connected in serial. In ADD, a plurality (2k number) of addition circuits are connected in parallel. Here, n is the number of data which are input in parallel, and k is the bit number of a digital multiplier.

Each sampling and holding circuit is a known structure, which stores the input analog voltage. The stored analog voltages are output in parallel on the order of two times the digital multiplier bit number to be multiplied. The 2k number of outputs are input in parallel to addition circuits ADD1p to ADDkp, and ADD1m to ADDkm. These addition circuits are similarly structured: ADD1p to ADDkp correspond to the positive multipliers, and ADD1m to ADDkm correspond to the negative multipliers.

The sampling and holding timing of each sampling and holding circuit are set by CTRL1, and the value of multiplier of each addition circuit is set by CTRL2.

Figure 3:
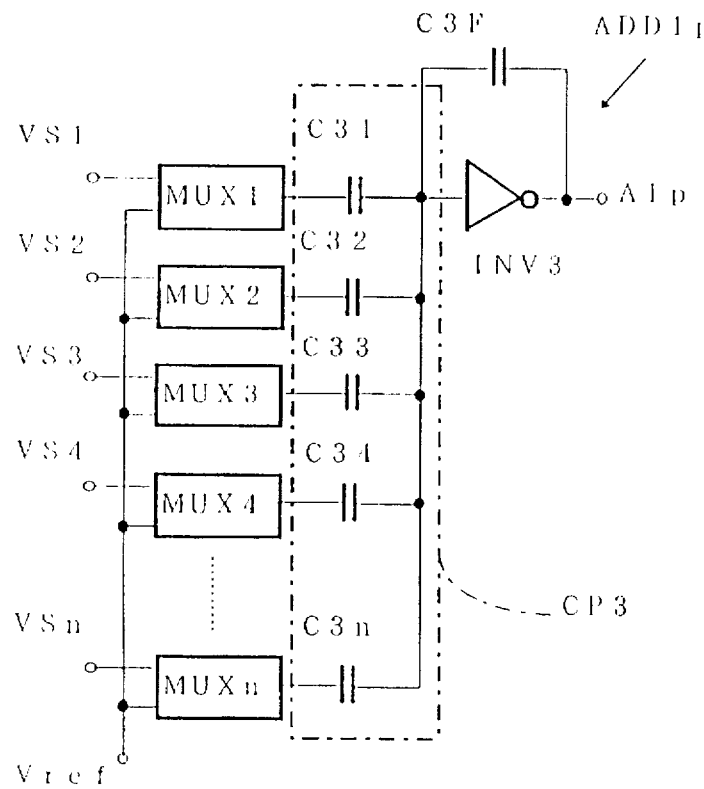
FIG. 3 shows an addition circuit with an included addition portion.

FIG. 3 shows addition circuit ADD1p having n multiplexers MUX1 to MUXn. These correspond to n inputs VS1 to VSn from SH1 to SHn, with VS1 to VSn and reference voltage Vref each input to its respective multiplexer. MUX1 to MUXn selectively output VS1 to VSn, or Vref, and the outputs are input to capacitive coupling CP3 containing capacitances C31 to C3n. The output of CP3 is input to inverting amplifying circuit INV3, whose output is connected to its input by feedback capacitance C3F.

Assuming that the control signals of MUX1 to MUXn are bp11 to bp1n, and the control signals to output VS1 to VSn and Vref are 1 and 0, respectively, output A1p of ADD1p is calculated by formula (1), with the voltage measurement reference assumed to be Vref in all operations hereinafter:

$$A_{lp} = -\frac{1}{C3F} \sum_{i=1}^{n} VSi \cdot bp1i \cdot C3i \quad (1)$$

When the i-th multiplier is positive and its LSB (Lowest Significant Bit) is 1, $bp1i=1$, and when the multiplier is positive and LSB is 0 or the multiplier is negative, $bp1i=0$. Generalizing, the output of j-th addition circuit Ajp is as in formula (2):

$$Ajp = -\frac{1}{C3F} \sum_{i=1}^{n} VSi \cdot bpji \cdot C3i \quad (2)$$

When the i-th multiplier is positive and its j-th bit (starting from the LSB is 1, $bpji=1$, and when the multiplier is positive and its j-th bit is 0 or the multiplier is negative, $bpji=0$.

Assuming the control signal is bmji, the outputs of addition circuits A1m to Anm corresponding to negative multipliers are expressed in formula (3):

$$Ajm = -\frac{1}{C3F} \sum_{i=1}^{n} VSi \cdot bmji \cdot C3i \quad (3)$$

The ratio of capacitances in the circuit in FIG. 3 is shown in formula (4):

$$C31 = C32 = \ldots = C3n = \frac{C3F}{n} \quad (4)$$

Figure 4:
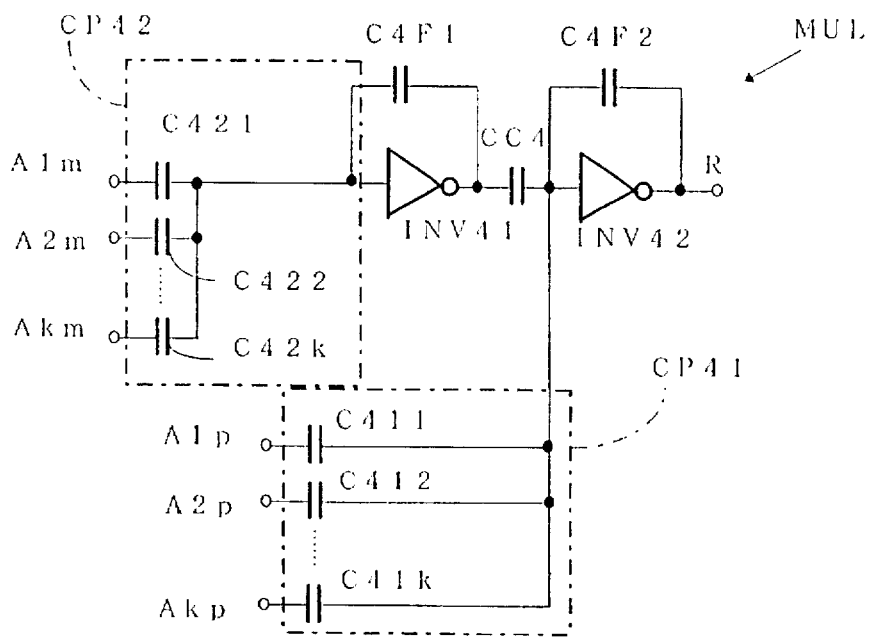
FIG. 4 shows an example of a multiplication portion of a first embodiment of the present invention.

Outputs A1p through Akp and A1m through Akm of ADD1p through ADDkp and ADD1m through ADDkm are input to multiplication portion MUL in FIG. 4. In MUL, A1p through Akp are integrated in capacitive coupling CP41, and A1m through Akm are integrated in capacitive coupling CP42. CP41 includes capacitances C411 through C41k which correspond to A1p through Akp, and CP42 includes C421 through C42k which correspond to A1m through Akm.

The output of CP42 is input to inverting amplifying circuit INV41, whose output is connected to its input through feedback capacitance C4F1. The output of CP42 is also connected to inverting amplifying circuit INV42 through intermediate capacitance CC4. The output of INV42 is connected to its input through feedback capacitance C4F2, similar to INV41.

The output of CP41 is connected to INV42 in parallel to CC4, and MUL generates output R, as shown by formula (5):

$$R = \frac{1}{C4F2} \sum_{i=1}^{k} \left( \frac{Aim \cdot C42i \cdot CC4}{C4F1} - Aip \cdot C41i \right) \quad (5)$$

Here, the capacitance ratios in FIG. 4 and in formula (4) are shown in Table 1.

TABLE 1

| Capacitance | Ratio |
|---|---|
| C3k | 1 |
| C3F | n |
| C42i | $2^{i-1}$ |
| C41i | $2^{i-1}$ |
| C4F1 | $2^k$ |
| C4F2 | $2^k$ |
| CC4 | $2^k$ |

From the ratios in Table 1 and formulas (2), (3) and (5), formula (6) is derived:

$$R = \frac{1}{n} \sum_{j=1}^{n} \sum_{i=1}^{k} SVj \cdot 2^{i-1} \cdot (bpji - bmji) \quad (6)$$

Multiplication is possible with multipliers of k-digit binary numbers including any symbol.

The unit capacitance number N for structuring the capacitances used in the above circuit is estimated as shown in Table 2.

TABLE 2

| Symbol showing capacitances | Capacity (Number of Unit Capacitances) | Number | Number of Circuits | Total Number of Unit Capacitances |
|---|---|---|---|---|
| C3k | 1 | n | 2k | 2kn |
| C3F | n | 1 | n | n |
| C41k & C42k | $2^0$ to $2^{k-1}$ | 2k | 1 | $2^{k+1}$ |
| C4F1, C4F2, CC4 | $2^k$ | 3 | 1 | $3 \times 2^k$ |
| Total | | | | $2^{k+1} + 3 \times 2^k + 2kn + n$ |

In a conventional circuit, since multiplication is performed prior to other operations, at least N' unit capacitances is necessary for multiplication and addition using k-bit multipliers for data n, as calculated by formula (7):

$$N' = 2^k \times 2 \times n + n \quad (7)$$

Assuming that the value of n is nc when N=N', the comparison between N and N' is shown in Table 3.

TABLE 3

| k | nc | when N > nc |
|---|---|---|
| 4 | 3.3 | N' > N |

TABLE 3-continued

| k | nc | when N > nc |
|---|-----|-------------|
| 8  | 2.5 | N' > N |
| 16 | 2.5 | N' > N |
| 32 | 2.5 | N' > N |

When the parallel data number is two to four (it is actually far larger, 100 or more), this circuit needs fewer unit capacitances than conventional circuits. This means that, in actual use, the present invention invariably requires fewer unit capacitances and inverting amplifying circuits than conventional ones.

TABLE 5

| Symbol showing capacitances | Capacity (Number of Unit Capacitances) | Number | Number of Circuits | Total Number of Unit Capacitances |
|---|---|---|---|---|
| C3j (j = 1 to n) | 1 | n | 2k | 2kn |
| C3F | n | 1 | 2k | 2kn |
| C41i (i = 1 to k) & C42i (i = 1 to k) | $2^{i-1}$ | 2 | 1 | $2^{k+1}$ |
| C4F1 & CC4 | 2k | 2 | 1 | $2^{k+1}$ |
| C4F2 | $2^{k+1}$ | 1 | 1 | $2^{k+1}$ |
| Total | | | | $3 \times 2^{k+1} + 4kn$ |

Note: A capacitance for multiplication includes the minimum bit dummy.

Figure 5:
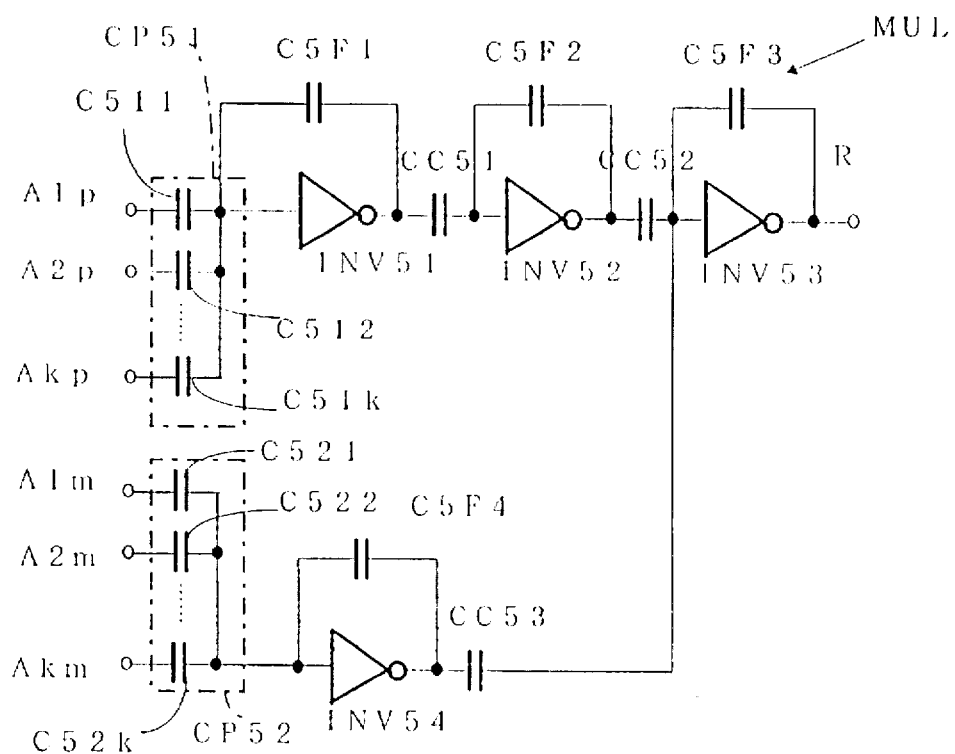
FIG. 5 shows another example of a multiplication portion of the present invention.

FIG. 5 shows another embodiment of multiplication portion MUL. In this MUL, capacitive couplings CP51 for the positive multiplier and CP52 for the negative multiplier are connected to three stages of serial inverting amplifying circuits INV51, INV52, and INV53, and one stage inverting amplifying circuit INV54, respectively, at their outputs. Outputs of INV51 to INV54 are connected to their own inputs through feedback capacitances C5F1, C5F2, C5F3, and C5F4, respectively. Intermediate capacitances CC51 and CC52 are connected between C5F1 and C5F2, and between C5F2 and C5F3, respectively.

The output of INV54 is connected to intermediate capacitance CC53, whose output is input to INV53 in parallel with the output of CC52. In the present embodiment, although the number of inverting amplifying circuits increases, the number of unit capacitances is further decreased compared to the embodiment shown in Table 4.

TABLE 4

| Symbol showing capacitances | Capacity (Number of Unit Capacitances) | Number | Number of Circuits | Total Number of Unit Capacitances |
|---|---|---|---|---|
| C51k & C52k | $2^0$ to $2^{k-1}$ | 2k | 1 | $2^{k+1}$ |
| C5F1 & C5F4 | 2k | 2 | 1 | $2 \times 2^k$ |
| C5F2, CC51 CC53 | 1 | 4 | 1 | 4 |
| C5F3 | 1 | 1 | 1 | 1 |
| Total | | | | $2^{k+2} + 5$ |

On the other hand, the unit capacitance total number in the circuit in FIG. 4 is $2^{k+2}+2^k$. When $2^k>5$, that is, when k>1.61 (usually k is around 8), the circuit in FIG. 5 has fewer unit capacitances than in FIG. 4. Since the capacitance ratio of the last-stage feedback capacitance C5F3 (2) is much less than that of C4F2 ($2^k$), circuit response is markedly improved.

Another unit capacitance number N is estimated as shown in Table 5.

In a conventional circuit, since multiplication is performed prior to other operations, at least N' unit capacitances is necessary for multiplication and addition using k-bit multipliers for data n, as calculated by formula (7) above.

Assuming that the value of n is nc when N=N', a comparison between N and N' is shown in Table 6.

TABLE 6

| k | nc | when N > nc |
|---|------|-------------|
| 4  | 5.33 | N' < N |
| 8  | 3.19 | N' < N |
| 16 | 3.00 | N' < N |

TABLE 6-continued

| k | nc | when N > nc |
|---|------|-------------|
| 32 | 3.00 | N' < N |

When the parallel data number is two to five (it is actually far larger, 100 or more), this circuit needs fewer unit capacitances than conventional circuits. This means that, in actual use, the present invention invariably requires fewer unit capacitances and inverting amplifying circuits than conventional ones.

In FIG. 5, the output of INV54 is connected to intermediate capacitance CC53, whose output is input to INV53 in parallel with the output of CC52. In the present embodiment, although the inverting amplifying circuit number increases, the unit capacitance number further decreases, as shown in Table 7.

TABLE 7

| Symbol showing capacitances | Capacity (Number of Unit Capacitances) | Number | Number of Circuits | Total Number of Unit Capacitances |
| --- | --- | --- | --- | --- |
| C51i (i = 1 to k) & C52i (i = 1 to k) | $2^{i-1}$ | 2k | 1 | $2^{k+1}$ |
| C5F1 & C5F4 | $2^k$ | 2 | 1 | $2^{k+1}$ |
| C5F2, CC51 to CC53 | 1 | 4 | 1 | 4 |
| C5F3 | 2 | 1 | 1 | 2 |
| Total | | | | $2^{k+2} + 6$ |

On the other hand, the unit capacitance total number in the circuit in FIG. 4 is $3 \times 2^{k+1}$. When $2^k > 3$, that is, when $k > 1.58$ (usually k is around 8), the circuit in FIG. 5 has fewer unit capacitances than in FIG. 4. Since the capacitance ratio of the last-stage feedback capacitance C5F3 (2) is far less than that of C4F2 ($2^{k+1}$), the response of the circuit is markedly improved.

Figure 6:
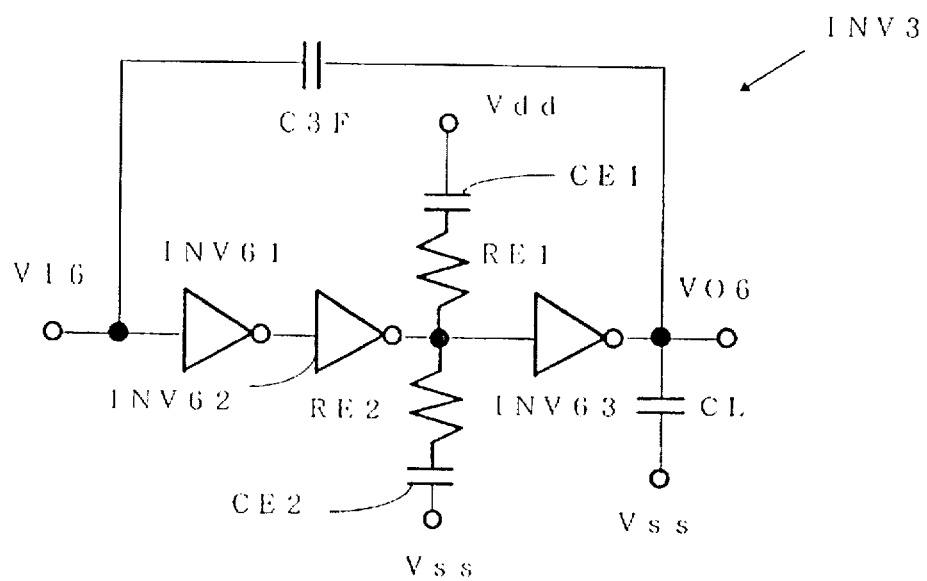
FIG. 6 shows an inverted amplifying circuit.

Inverting amplifying circuit INV3 in FIG. 3 is structured as shown in FIG. 6, and other inverting amplifying circuits are similarly structured. In INV3, CMOS inverters INV61, INV62, and INV63 are serially connected in three stages, and the output of the last-stage CMOS inverter is connected to the input of the first-stage CMOS inverter through feedback capacitance C3F. From input VI6, the inverting amplifying circuits generate inverted output VO6 with good linearity due to its large gain and the effects of the feedback loop.

The output of INV63 is connected to a low supply-voltage Vss (a ground, for example) through grounded capacitance CL, and oscillation of inverting amplifying circuit, including the feedback loop is prevented because of its low-pass filter effect. The output of INV62 is connected to supply voltage Vdd through resistance RE1 and capacitance CE1, and connected to low supply-voltage Vss through resistance RE2 and capacitance CE2. These resistances are the load of the inverting amplifying circuits. The resistances control the gain and prevent oscillation. CE1 and CE2 interrupt low-frequency penetrating current to minimize electric power consumption in the resistances.

Oscillation caused by the increase of load of the inverting amplifying circuits can be prevented by a serial RC-circuit connecting the input and output of INV62 or INV63 instead of RE1 and RE2. This configuration results in a smaller circuit than in FIG. 6.

Figure 7:
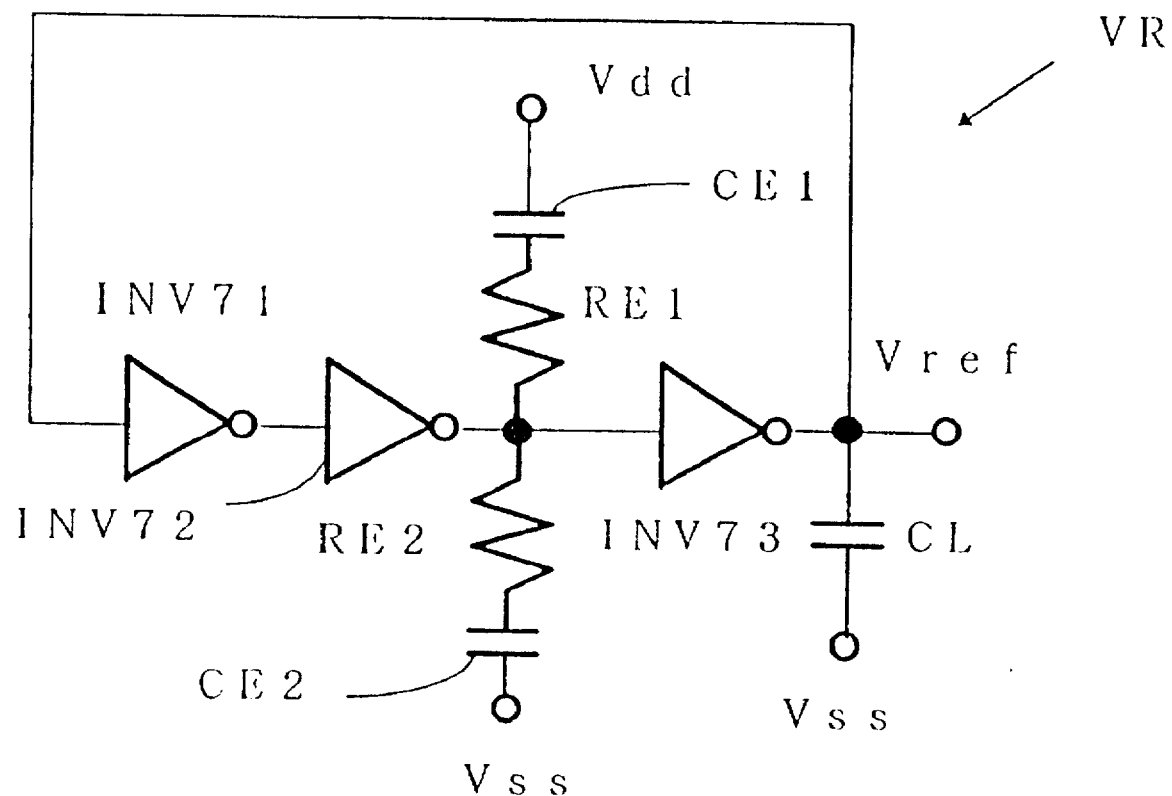
FIG. 7 shows the reference voltage generating circuit.

FIG. 7 shows circuit VR for forming the reference voltage Vref. This is configured by reducing input VI6 and feedback capacitance C3F of the circuit in FIG. 6. It includes CMOS inverters INV71, INV72, INV73, grounded capacitance CL, resistances RE1 and RE2, and capacitances CE1 and CE2.

VR outputs the stable value, at which the input is in balance, status as the reference voltage Vref. This stable point can be freely changed by setting the threshold voltage of the CMOS inverters. To realize the dynamic range in both positive and negative directions maximum, Vref is set Vdd/2.

Figure 8:
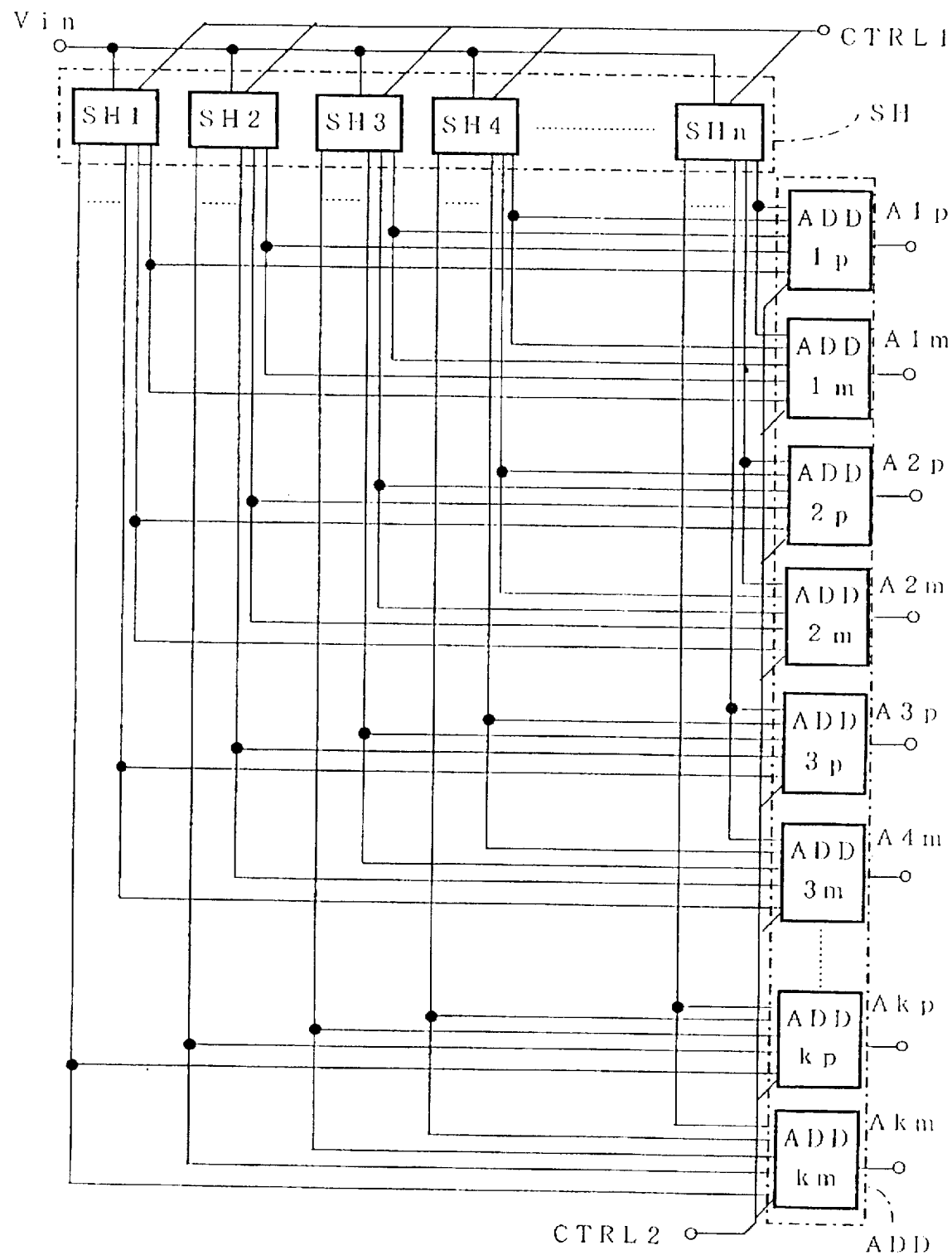
FIG. 8 shows a block diagram of the sampling and holding portion and the addition portion of a second embodiment of the present invention.
Figure 9:
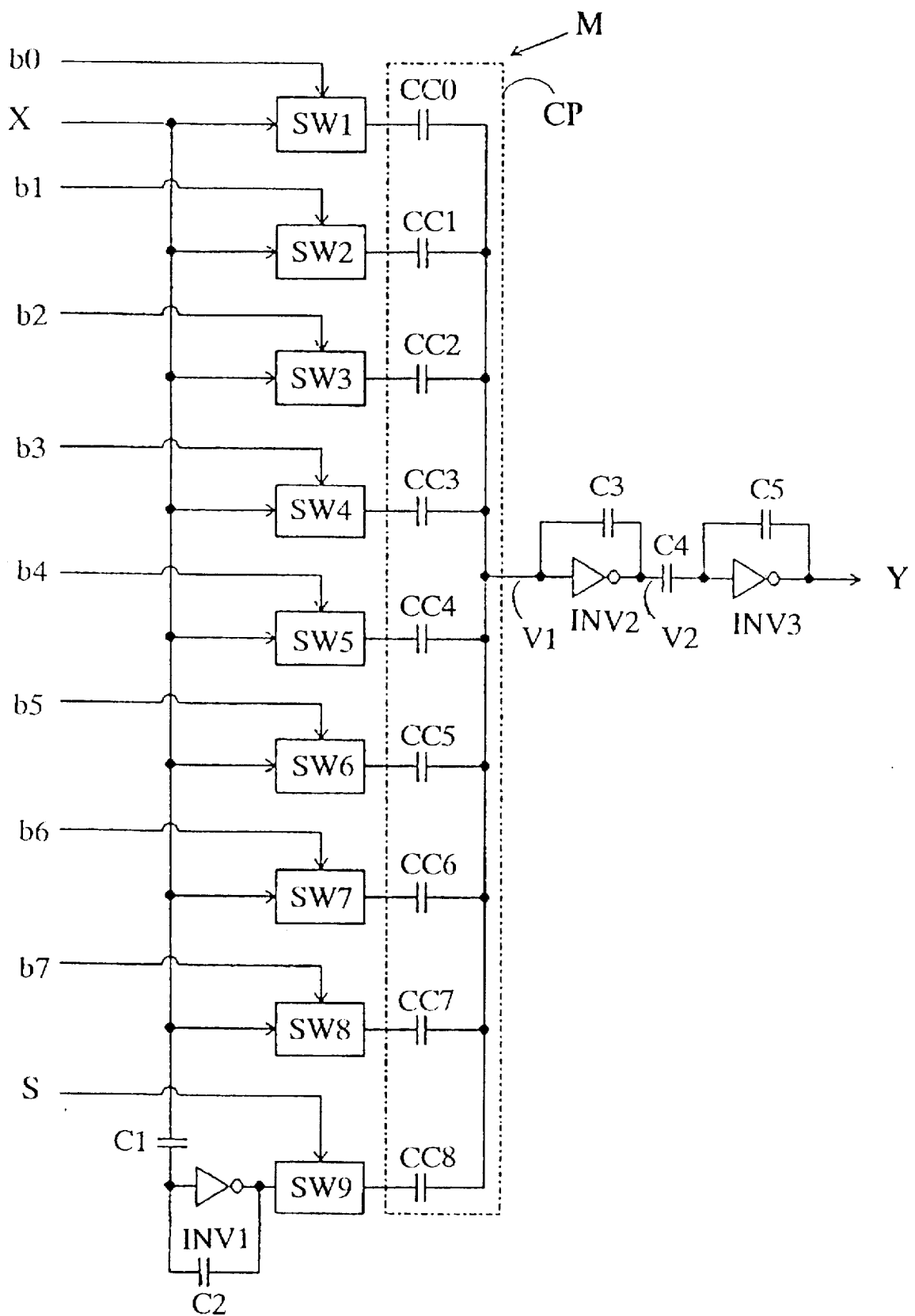
FIG. 9 shows a conventional multiplication circuit.

FIG. 8 shows another embodiment of a sampling and holding portion and an adding portion. Analog input voltage is connected in parallel to each sampling and holding circuit. Sampling and holding portions are controlled by control signal CTRL1 to replace the oldest analog input voltage by the newest. With no data transmission necessary between the sampling and holding circuits, transmission errors are not generated.

Here, as in FIG. 2, circuit timing is described by using eight sampling and holding circuits. Assuming that the analog voltage stored in sampling and holding circuits SH1 to SH8 is V(SH1) to V(SH8), multipliers adopted by addition circuits ADD1 to ADD8 are M(ADD1) to M(ADD8), and sampling interval is Δt, the stored voltage and multipliers change from t0 to t0+3 Δt, as in FIG. 10.

In FIG. 10, V(SHi) is the analog voltage stored in sampling and holding circuit SHi, M(ADDi) is a multiplier adopted in addition circuit ADDi, m1 to m8 are eight multipliers, Δt is a sampling cycle of a sampling and holding circuit, and Vin(t0−iΔt) is the analog input voltage from time t0 to time iΔt before t0.

In FIG. 10, at time t0, assuming that analog voltage is sequentially stored in SH8, SH7, . . . SH1, and multipliers m1 to m8 are adopted by ADD1, ADD2, ... ADD8, respectively, the oldest analog voltage Vin (t0−7 Δt) is stored in SH8. At time t0+Δt, the oldest analog voltage Vin (t0−7 Δt) is renewed by the newest voltage Vin(t+Δt). The multipliers that are multiplied with each analog voltage are rotated by one increment, so that eventually, ADD1 to ADD7 adopt m2 to m8, respectively, and ADD8 adopts m1. After this, the oldest analog voltage is replaced by the newest, and the multipliers similarly rotate, producing the effect that the multipliers are fixed and analog voltage is sequentially transmitted.

As mentioned above, when data is not transmitted, the multipliers are sequentially changed. Therefore, multipliers are circularly changed by control signal CTRL2 in each addition circuit.

The multiplication and addition circuit according to the present invention performs addition by every bit corresponding to the multiplier of a plurality of data beforehand, and then weights the addition results according to the weight of each bit. Therefore, multiplication and addition can be performed by digital multipliers with a fewer number of capacitances for a plurality of analog voltages.

What is claimed is:

1. A multiplication and addition circuit for performing multiplication and addition by adopting a digital multiplier for a plurality of analog voltages, said circuit comprising:

a plurality of multiplexers which perform one-bit multiplication of every bit corresponding to each said digital multiplier;

a plurality of addition circuits which add an output of each said multiplexer of each corresponding bit by a capacitive coupling; and a plurality of multiplication circuits which add outputs of said addition circuits weighted by another capacitive coupling according to each corresponding bit weight.

2. The multiplication and addition circuit as claimed in claim 1, wherein said analog voltage is initially stored by a sampling and holding circuit.

3. The multiplication and addition circuit as claimed in claim 1, wherein said addition circuit comprises:

a plurality of multiplexers to which said analog voltages and reference voltage are input, which alternatively outputs said analog voltage or said reference voltage;

a capacitive coupling to which said multiplexer outputs are connected;

an inverting amplifying circuit to which said capacitive coupling outputs are connected, said inverting amplifying circuit comprising CMOS inverters serially connected in an odd number of stages; and a feedback capacitance which connects an output of said inverting amplifying circuit to its input.

4. The multiplication and addition circuit as claimed in claim 1, wherein said addition circuit comprises:

a capacitive coupling which adds outputs of said addition circuit weighted according to each corresponding bit weight;

an inverting amplifying circuit to which said capacitive coupling outputs are connected, said inverting amplifying circuit comprising CMOS inverters serially connected in an odd number of stages; and a feedback capacitance which connects an output of said inverting amplifying circuit to its output.

5. A multiplication and addition circuit for performing multiplication and addition by adopting a digital multiplier for a plurality of analog voltages, said circuit comprising:

a plurality of multiplexers which perform one-bit multiplication of every bit corresponding to each said digital multiplier;

a plurality of first addition circuits which add multiplexer outputs of every corresponding bit of a positive multiplier;

a plurality of second addition circuits which add multiplexer outputs of every corresponding bit of a negative multiplier;

a plurality of first multiplication circuits which add outputs of said first addition circuits weighted by capacitive coupling according to each corresponding bit weight;

a plurality of second multiplication circuits which add outputs of said second addition circuits weighted by other capacitive coupling according to each corresponding bit weight; and a subtraction circuit which subtracts said second multiplication circuit output from said first multiplication circuit output.

6. The multiplication and addition circuit as claimed in claim 5, wherein said first addition circuit comprises:

a plurality of multiplexers which perform one-bit multiplication by a bit corresponding to each digital multiplier;

a capacitive coupling which add multiplexer outputs of each bit corresponding to a positive multiplier;

an inverting amplifying circuit comprising an odd number of stages of serial CMOS inverters connected to said capacitive coupling outputs; and a feedback capacitance which connects an output of said inverting amplifying circuit to its input.

7. The multiplication and addition circuit as claimed in claim 5, wherein said second addition circuit comprises:

a plurality of multiplexer which perform one-bit multiplication by a bit corresponding to each digital multiplier;

a capacitive coupling which add multiplexer outputs of each bit corresponding to a negative multiplier;

an inverting amplifying circuit comprising an odd number of stages of serial CMOS inverters connected to said capacitive coupling outputs; and a feedback capacitance which connects an output of said inverting amplifying circuit to its input.

8. The multiplication and addition circuit as claimed in claim 5, wherein said first multiplication circuit comprises:

a capacitive coupling which adds outputs of said first addition circuit weighted according to each corresponding bit weight;

an inverting amplifying circuit to which said capacitive coupling outputs are connected, said inverting amplifying circuit comprising CMOS inverters serially connected in an odd number of stages; and a feedback capacitance which connects an output of said inverting amplifying circuit to its input.

9. The multiplication and addition circuit as claimed in claim 8, wherein said subtraction circuit comprises an intermediate capacitance, said intermediate capacitance being connected to an output of said second multiplication circuit and being connected to said inverting amplifying circuit of said first multiplication circuit in parallel with said capacitive coupling of said first multiplication circuit.

10. The multiplication and addition circuit as claimed in claim 8, wherein said subtraction circuit comprises:

a first intermediate capacitance;

a first inverting amplifying circuit, said first inverting amplifying circuit comprising an odd number of stages of serial CMOS inverters;

a second intermediate capacitance;

a second inverting amplifying circuit, said second inverting amplifying circuit comprising an odd number of stages of serial CMOS inverters connected serially and sequentially to an output of said first multiplication circuit;

a third intermediate capacitance connected to an output of said second multiplication circuit; and an output of said third intermediate capacitance connected to said second inverting amplifying circuit in parallel with said second intermediate capacitance.

11. The multiplication and addition circuit as claimed in claim 5, wherein said second multiplication circuit comprises:

a capacitive coupling which adds outputs of said first addition circuit weighted according to each corresponding bit weight;

an inverting amplifying circuit to which said capacitive coupling outputs are connected, said inverting amplifying circuit comprising CMOS inverters serially connected in an odd number of stages; and a feedback capacitance which connects an output of said inverting amplifying circuit to its input.

12. The multiplication and addition circuit as claimed in claim 11, wherein said subtraction circuit comprises an intermediate capacitance, said intermediate capacitance being connected to an output of said second multiplication circuit and being connected to said inverting amplifying circuit of said first multiplication circuit in parallel with said capacitive coupling of said first multiplication circuit.

13. The multiplication and addition circuit as claimed in claim 11, wherein said subtraction circuit comprises:
   a first intermediate capacitance;
   a first inverting amplifying circuit, said first inverting amplifying circuit comprising an odd number of stages of serial CMOS inverters;
   a second intermediate capacitance;
   a second inverting amplifying circuit, said second inverting amplifying circuit comprising an odd number of stages of serial CMOS inverters connected serially and sequentially to an output of said first multiplication circuit;
   a third intermediate capacitance connected to an output of said second multiplication circuit; and
   an output of said third intermediate capacitance connected to said second inverting amplifying circuit in parallel with said second intermediate capacitance.

14. The multiplication and addition circuit as claimed in claim 5, wherein said subtraction circuit comprises an intermediate capacitance, said intermediate capacitance being connected to an output of said second multiplication circuit and being connected to said inverting amplifying circuit of said first multiplication circuit in parallel with said capacitive coupling of said first multiplication circuit.

15. The multiplication and addition circuit as claimed in claim 5, wherein said subtraction circuit comprises:
   a first intermediate capacitance;
   a first inverting amplifying circuit, said first inverting amplifying circuit comprising an odd number of stages of serial CMOS inverters;
   a second intermediate capacitance;
   a second inverting amplifying circuit, said second inverting amplifying circuit comprising an odd number of stages of serial CMOS inverters connected serially and sequentially to an output of said first multiplication circuit;
   a third intermediate capacitance connected to an output of said second multiplication circuit and
   an output of said third intermediate capacitance connected to said second inverting amplifying circuit in parallel with said second intermediate capacitance.

16. The multiplication and addition circuit as claimed in claim 5, wherein said analog voltage is initially stored by a sampling and holding circuit.

17. A multiplication and addition circuit for performing multiplication and addition by adopting digital multipliers for a plurality of analog voltages, said circuit comprising:
   a sampling and holding circuit which stores said plurality of analog;
   a plurality of multiplexers which perform one-bit multiplication on said analog voltages, said analog voltages being output from said sampling and holding circuit by a bit corresponding to each said digital multipliers;
   multiplier controlling means which synchronously circulates a settling time of each bit multiplexer and replaces an oldest analog voltage by a newest analog voltage in said sampling and holding circuit;
   a plurality of addition circuits which adds multiplexer outputs of each corresponding bit by a capacitive coupling; and
   a plurality of multiplication circuits which add outputs of said addition circuits weighted by a capacitive coupling according to each corresponding bit weight.

18. A multiplication and addition circuit for performing multiplication and addition by adopting digital multipliers for a plurality of analog voltages, said circuit comprising:
   a sampling and holding circuit which stores said plurality of analog voltages;
   a plurality of multiplexers which perform one-bit multiplication by a bit corresponding to each said digital multiplier which is output from said sampling and holding circuit;
   multiplier controlling means which synchronously circulates a settling time of each bit multiplexer and replaces an oldest analog voltage by a newest analog voltage in said sampling and holding circuit;
   a plurality of first addition circuits which add multiplexer outputs of each corresponding bit of a positive multiplier by a capacitive coupling;
   a plurality of second addition circuits which add multiplexer outputs of each corresponding bit of a negative multiplier by a capacitive coupling;
   a plurality of first multiplication circuits which add outputs of said first addition circuits weighted by a capacitive coupling according to the weight of each corresponding bit;
   a plurality of second multiplication circuits which add weighted outputs of said second addition circuits by a capacitive coupling according to each corresponding bit weight; and
   a subtraction circuit which subtracts an output of said second multiplication circuit from an output of said first multiplication circuit.

* * * * *